Patented Oct. 28, 1930

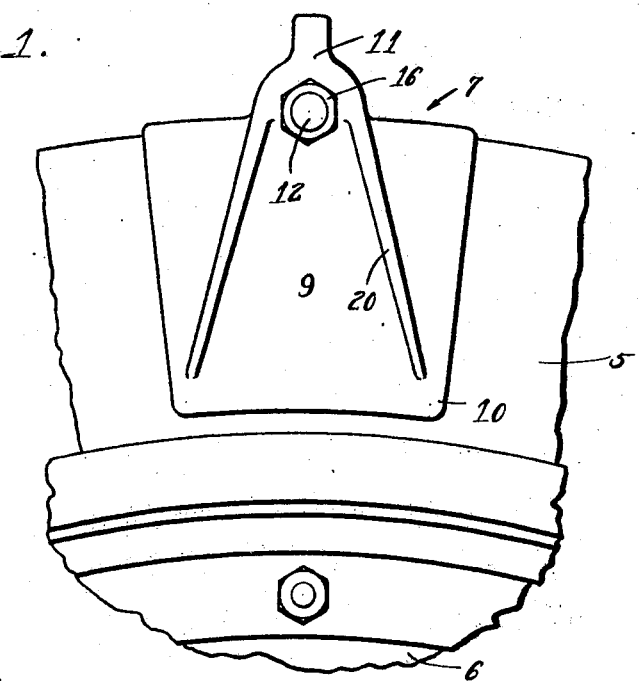
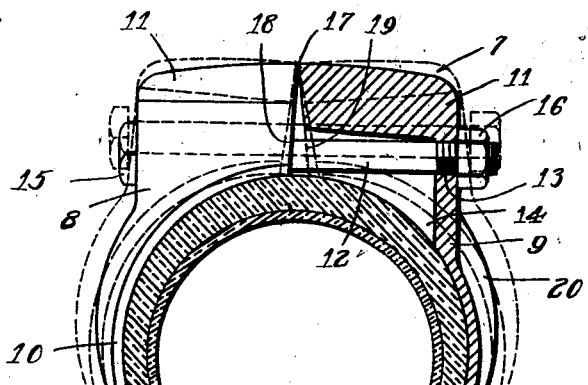
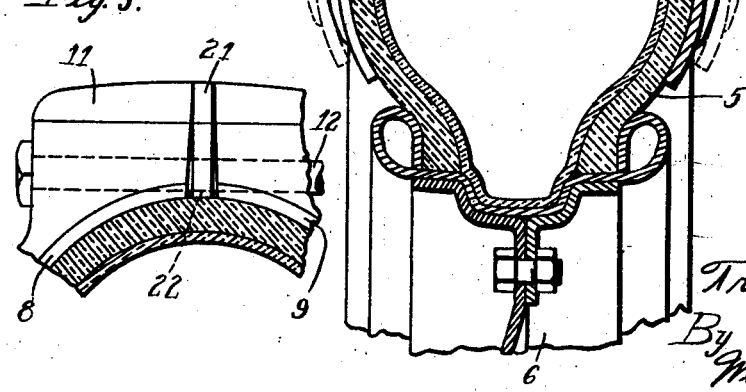

1,779,689

UNITED STATES PATENT OFFICE

TROY W. BECHTOLD, OF FREEPORT, ILLINOIS, ASSIGNOR TO GEORGE E. MAURER, LESLIE LE VEQUE, AND JOSEPH WEST GEARHART, ALL OF FREEPORT, ILLINOIS

TIRE LUG

Application filed May 5, 1927, Serial No. 188,880. Renewed March 20, 1930.

This invention relates to traction devices and more particularly a tire lug for use on motor vehicles.

The principal object of the present invention is to provide a tire lug intended for attachment solely to the tire of the vehicle wheel so as not to rely on any fastening means passing around the felly of the wheel between the spokes thereof. In other words, the present device is applicable as readily to disc wheels as to artillery wheels, and is furthermore not limited in its application to wheels where there is sufficient clearance for a chain or other fastening to be extended between the spokes through the space between the brake drum and the felly of the wheel, which usually is a very limited space especially in the more recent designs.

According to the present invention, I provide a two-piece shoe to fit about the sides of the tire and over the tread thereof, the two pieces having projections thereon for traction purposes through which a fastening bolt is passed to hold the pieces together and clamp the tire therebetween. The meeting faces of the traction projections of the two pieces according to my invention are so conformed that when they come into engagement during the tightening of the bolt the pieces fulcrum on one another at their outermost portions such that the innermost portions are drawn together in the further tightening of the bolt and are adapted firmly to grip the tire therebetween by pinching the side walls thereof. Although, of course, the device will be provided in various sizes to fit the standard sized tires, I may also provide spacers to be introduced between the pieces to have the latter fulcrum on the opposite sides thereof and to have the fastening bolt passed therethrough, thus enabling use of the pieces on a tire larger than the particular size of tire for which the same were intended.

The invention is illustrated in the accompanying drawing, wherein Fig. 1 is a side view of a tire lug made in accordance with my invention and shown applied to the tire of a vehicle wheel;

Fig. 2 is a front or rear view with the tire and rim in section, and also with the right-hand half of the tire lug appearing in section more clearly to illustrate the construction, a comparison of the dotted line and full line positions of the parts serving to indicate the manner of application of the device and the novel manner in which the same is caused to grip the tire; and Fig. 3 is a detail along the lines of Fig. 2 showing the use of a spacer for accommodating the tire lug to a larger size tire.

My invention is illustrated as applied to a pneumatic tire 5 on a wheel 6 of the disc type. As stated above and as will appear hereinafter, the device is applicable to any type of wheel and to any type of tire, it being worthy of note, however, that the same was designed more particularly for use on balloon tires, which are now more commonly used. The universal application of the device results from the fact that it attaches solely to the tire of the wheel. The tire lug is indicated generally by the reference numeral 7, and is composed of two complementary and interchangeable pieces 8 and 9 which, because of their shape, are preferably formed by casting. The body portion 10 of each of the pieces is conformed to the curvature of the tire both in a transverse and in a longitudinal plane as will be evident from the two views, so as properly to fit about the opposite side walls of the tire and over the tread thereof. Each of the pieces has a substantial transverse projection 11 provided on the tread portion of the body thereof for traction purposes, the projections on the two pieces being disposed in alignment when the lug is placed on the tire. A bolt 12 extends longitudinally through the projections 11 and passes freely through openings 13 in the ends thereof, the projections being cored out as indicated at 14 partly to conserve in the amount of metal used in the casting and partly to allow a certain amount of freedom for rocking motion of the pieces 8 and 9 on the bolt 12 for a purpose presently to appear. The head end 15 of the bolt 12 bears against the end of the projection 11 on the piece 8, and a nut 16 threads onto the bolt 12 and bears against the end of the projection 11 on the piece 9 to fasten the parts together. The projections 11 of the pieces 8 and 9 first come into engagement at a point 17 outwardly displaced relative to the bolt 12 so that the further tightening of the bolt causes the two pieces to fulcrum on one another at the point 17 and be drawn together to clamp the tire firmly therebetween. The pinching action may be increased as much as desired until the meeting faces 18 and 19 of the pieces 8 and 9 are brought into actual flush engagement. These faces, it will be observed, are bevelled or tapered inwardly from the point of engagement at 17 at a comparatively slight angle but sufficient to afford a tolerable pinching action of the lug on the tire. It is found that the resilience of the tire makes it quite unnecessary to provide a lock washer or lock nut in connection with the nut 16, and there is little or no danger of the lug getting loose or dropping off once the bolt is tightened. The traction afforded by the projections 11 is sufficient to enable a car to pull through heavy mud, sand or snow with comparative ease. The reinforcing ribs indicated at 20, which extend in convergent relation from the projections 11 down along the sides of the pieces 8 and 9 have also been found to afford considerable additional traction. The device is obviously quickly attachable and detachable without necessitating the jacking up of the car, and, by reason of its attachment solely to the tire, the device will never mar the finish of the wheel.

As stated above, the device will ordinarily be provided in various sizes to fit the standard sized tires but it will be obvious that the purchaser may desire to use the same set of tire lugs on different sized tires, and in that event I prefer to provide one or more spacer washers 21, which may be inserted between the pieces 8 and 9 to accommodate the device to a slightly larger sized tire. The spacer 21 is preferably provided with an opening 22 through which to pass the bolt 12 to hold the same in place. It will be obvious that the device will still exert the same pinching action on the tire when the bolt 12 is tightened, provided, of course, that the spacer 21 is of the proper size. It will be evident that the thickness of the spacer may be varied to moderate the pinching action to the desired extent.

I claim:

1. A traction device for attachment to the tire of a vehicle wheel comprising a two-section shoe divided in the longitudinal median plane of the tread of the tire, said sections having transverse traction projections on the tread portion thereof disposed in alignment, the contiguous edges of said sections coming into abutment with one another only at the outermost portion of said traction projections, and a bolt extending longitudinally through the base portion of said projections.

2. A traction device for attachment to the tire of a vehicle wheel comprising a two-section shoe divided in the longitudinal median plane of the tread of the tire, said sections having transverse traction projections on the tread portion thereof disposed in alignment, the contiguous edges of said sections coming into abutment with one another only at the outermost portion of said traction projections, and fastening means interconnecting the two sections of the shoe below the point of abutment and arranged when tightened to draw the two sections of the shoe together to hold on the tire.

In witness of the foregoing I affix my signature.

TROY W. BECHTOLD.